Figure 1:
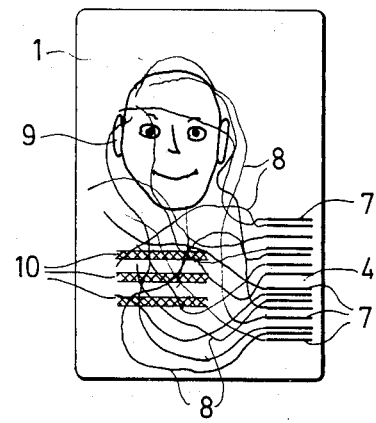

United States Patent [19]

Rothfjell

[11] Patent Number: 4,590,366
[45] Date of Patent: May 20, 1986

[54] METHOD OF SECURING SIMPLE CODES

[75] Inventor: Rolf E. Rothfjell, Kalix, Sweden

[73] Assignee: Esselte Security Systems AB, Stockholm, Sweden

[21] Appl. No.: 625,467

[22] Filed: Jun. 28, 1984

[30] Foreign Application Priority Data

Jul. 1, 1983 [SE] Sweden ............................. 8303800

[51] Int. Cl.⁴ ............................................. G06K 19/06
[52] U.S. Cl. ..................................... 235/494; 235/462; 283/77; 283/904
[58] Field of Search ............... 235/437, 468, 487, 380, 235/462, 494; 283/77, 94, 105, 901, 903, 904

[56] References Cited

U.S. PATENT DOCUMENTS 4,423,415 12/1983 Goldman ...................... 235/382 X
4,504,083 3/1985 Devrient et al. ...................... 283/77

Primary Examiner—David L. Trafton
Attorney, Agent, or Firm—Silverman, Cass & Singer, Ltd.

[57] ABSTRACT

The invention relates to a method of securing simple codes (5), which are built-up of a plurality of lines, symbols or patterns, which are readable by a machine, and which codes (5) are intended to be located on documents (2), valuable documents or marked units.

The invention is characterized in that in the generating or writing-down of the codes (5) one or more of said lines, symbols or patterns constituting the code (5) each are caused to transform to a line (11) or an area, which does not constitute a part of the code (5), but constitutes a part of a pattern, in order to render a falsification by altering the code after its writing-down substantially more difficult.

According to a preferred embodiment the invention further is characterized in that a so-called line code (5) is generated, and in its generation or writing-down one or several of the lines associated with the code are caused to continuously or intermittently transform to a line (11) deviating from the line associated with the code.

6 Claims, 4 Drawing Figures

METHOD OF SECURING SIMPLE CODES

This invention relates to a method of securing simple codes.

Simple codes can be exemplified by a line code, for example EAN-code, or other code, which is readable mechanically or visually and contains information.

A line code can relatively easily be falsified, because one or several lines can be obliterated and new lines readily be inserted.

It would be advantageous, for example, to use a line code on an identification document, credit card, document of value etc., because information stored in the code easily can be read in mechanically to a computer.

Such information, for example, when used in connection with a passport, can contain the nationality, identification card number etc. of the person. Such information can be utilized, for example, in such a way that the officers checking the passport read the code by means of a reading pencil, and a computer, to which the reading pencil is connected, immediately provides the officers with information on the person which are of relevance for the person's passage through the passport examination.

On documents of value information of relevance for the documents, for example share number, company, nominal amount, type etc., can be contained in a line code for easy reading by a machine.

On a credit card, for example, the maximum amount per purchase and/or other information, for example, the identification card number of the person, the bank account number, to which the credit card is connected, can be stored in a simple mechanically readable code, for example a line code.

It is apparent that there exist a very great number of application possibilities of simple codes, which can easily be read mechanically. The aforementioned applications are only a few examples.

Simple codes as referred to above are understood to be codes constructed in a simple manner, for example a line code. A normal printed text, however, is also a simple code in the sense of the present application. The invention is described in the following with reference to a line code as example, but the invention can be applied to any other simple code or text. The line code example, therefore, does by no means restrict the invention.

The present invention, thus, relates to a method of securing simple codes, which are formed by a plurality of lines, symbols or patterns, which are mechanically readable, and which codes are intended to be located on documents, valuable documents or marked units. The invention is characterized in that in the generation or writing down of the codes one or several of said lines, symbols or patterns constituting a code each are caused to transform to a line or area, which do not constitute any part of the code, but constitute a part of a pattern, in order to make falsification by altering the code after it had been written down substantially more difficult.

Such alteration is rendered very difficult, because a code portion can be alteration of detection by no longer transforming to the pattern, which does not constitute a code.

The lines, symbols or patterns constituting a code preferably are caused in their generation to continuously transform to the pattern, which does not constitute a code.

Furthermore, continuous or intermittent colour transitions between or within the pattern are used for additionally increasing the safety level.

According to a preferred embodiment, two or more of said lines or areas, which do not constitute said code, are caused together to form a pattern over a portion of the document or the like, to which the code is applied.

According to a further preferred embodiment, the pattern formed is generated in its entirety outside the area taken up by the code.

Said lines, symbols or patterns constituting a code, of course, can be of any suitable type.

A line code, however, is to be preferred especially, because it can easily be read mechanically, and because it can easily be interpreted visually when the observer knows the key of the code.

A great number of mechanical reading equipment, besides, is commercially available for the scanning of line codes.

In the generation of a line code, one or several of the lines associated with the code are caused to continuously or intermittently transform to lines deviating from the line associated with the code. Deviations are brought about by causing the lines to form an angle to the lines associated with the code and/or by designing the lines non-linear.

According to a preferred embodiment, the lines are caused to describe a wave pattern or other non-linear patterns. The patterns thus formed can have a different degree of complexity. All patterns, from simple to complicated ones, can be used, depending, of course, among other things on the desired or required safety level. For obtaining an extremely high safety level, the pattern can consist of a safety pattern, a so-called guilloche.

Figure 2:
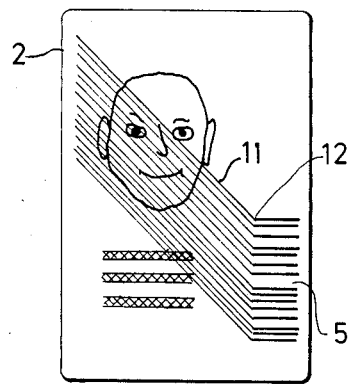
Figure 3:
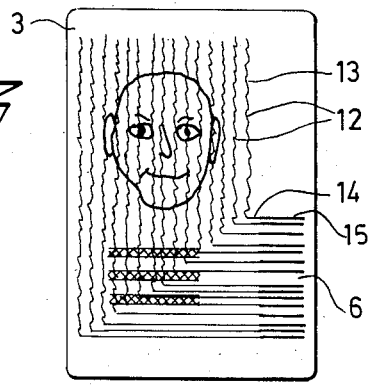
Figure 4:
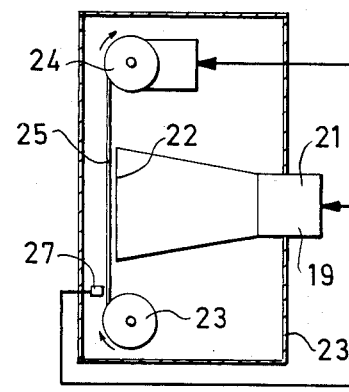

The invention is described in the following in greater detail, with reference to the embodiment shown in the accompanying drawing, in which FIG. 1, 2 and 3 show cards provided with code and associated different patterns, and FIG. 4 is a basic block diagram of a device, which can be used for generating a code and associated pattern.

In FIGS. 1, 2 and 3 an identification document 1,2,3 is used as an example of document, and a line code 4,5,6 is used as an example of said code. In FIG. 1 each line 7 is extended to a line 8. The transition can be continuous or intermittent and, when desired, can contain colour transitions. Each line 8 is non-linear and varies with an irregular wave pattern over portions of the card 1. As appears from FIG. 1, a portion of the lines extends over an image 9 of a person's face and over relevant text 10, for example a name and birthdata registration number, as schematically marked in FIGS. 1-3. In FIGS. 1-3 the lines 8,11,12 are relatively coarse. Preferably, however, the lines are drawn very thin in order not to interfere with the visual impression, for example, of the person's image 9 or relevant data. The lines 8,11, 12 can be coloured differently in order to make falsification still more complicated.

If the document is forged by moving one or several lines 7 in the line code 4-6 or by altering the thickness, it also is necessary to move, thicken or thin the associated line 8. This is extremely difficult to carry out so that it will not be detected at a check of the document. When the document is produced photographically, as exemplified below, or when it is printed with so-called safety print, it is substantially impossible to perform such a forgery so as not to be detected.

In FIG. 1 the pattern formed by the lines 8 is irregular. The lines, however, can be drawn so as to be comprised in a regular pattern and in such a case can consist, for example, of line extensions forming together a safety pattern, for example a so-called guilloche. The pattern shown in FIG. 1, therefore, must not be regarded a preferred pattern.

In FIG. 2 a line code 5 with associated lines 11 is shown. According to this example, the lines 11 are straight, but form an angle to the lines in the line code 5. When a line in the code 5 is moved, either the entire associated line 11 must be moved, or the intersection point 12 for the line in code 5 and the line 11 is moved so that the intersection point is not located along the same straight line as described by the remaining intersection points.

In FIG. 2 the relevant text 10 is located in an area, over which the lines 11 do not extend. When the line code contains the name of the person, the correctness of the name can be checked by reading the line code. It is not necessary, therefore, that all information on a document, a valuable document etc. is covered entirely or partially by lines 8,11,12, but the information can be stored in the line code.

In FIG. 3 a third example is shown where the lines 12 are partially wave-shaped, and the wave-shaped portion 13 extends from a straight extension 14 from each line 15.

It is obvious that an indefinite variation of lines 8,11,12 can be imagined forming a specific pattern.

The present invention is especially suitable for use for an identification or corresponding document, because portions of the image and/or relevant data can be secured against falsification by allowing the lines to intersect said portions.

The type of document, however, implies different possibilities and requirements in respect of the design of the line code.

A share certificate or a banknote, for example, can be designed so that the safety pattern normally contained therein comprises or consists of lines being extensions of the lines in the line code.

In the examples shown in the Figures, only the line code has been chosen as example, but it is obvious, that every other code, for example an alphanumerical line, can be the starting point for a number of lines. The invention, therefore, must not be regarded in any part restricted to the utilization of a line code.

In the foregoing identification cards, share certificates and banknotes have been mentioned. A great number of articles, for example price tags, also are in demand of safe codes, for example line codes. In such cases the complexity of the pattern in view of the manufacturing cost of the pattern can be related to the safety against falsification. In certain cases the pattern is designed simpler than described above. The lines together, for example, can form a name written in letters, in the case of price tags, for example, the name of the merchant.

The method of manufacturing the document or the like also can influence the design of the pattern described by the lines.

FIG. 4 illustrates a schematic block diagram for an imaginable manufacturing equipment. The equipment and associated method are suitably among other uses for manufacturing identification and other documents where the information content is specific for each copy of the document.

In FIG. 4 a keyboard 16 for the feed-in of data, for example the name, birthdate registration number etc. of the person into a computer 17 with associated memory 18 is shown. The computer 17 is capable in knwon manner to control a known exposing device 19, where an electron gun 21 is caused to act onto a fluorescent screen 22, i.e. like a television set. A film advancing device 23,24 for a film 25 is located in a housing 23 enclosing among other things the screen 22.

The computer 17, thus, is capable of presenting on the screen 22 the information, which has been fed into the computer memory 18 by means of the keyboard 16. It is assumed that the cards according to FIGS. 1, 2 or 3 are to be manufactured. Persons and names and other alphanumeric information intended to be directly readable preferably are photographed. Such a film strip 25 exposed after a number of photographings is inserted undeveloped into the feeding device 23,24. The device 23,24 compises a motor 26 for advancing the film 25, and the motor 26 is controlled by the computer 17. A scanning element 27 is provided to scan the position of the exposings of the film strip. The element 27 is capable of emitting a signal to the computer 17, which signal indicates the film strip frame being in exposing position.

When a card according to FIGS. 1—3 is to be manufactured, the computer is capable of recording a line code which, for example, contains information on the form of the name and birthdate registration number of the person in accordance with the information fed-in via the keyboard. The computer further is capable from the lines of the line code to expose extensions in the form of the lines 8. When a frame for a certain person is in exposing position, the element 27 emits a signal, whereby the computer controls the electron gun 21 so that the associated line code 4,5,6 and the lines 8,11,12 are drawn on the screen 22, whereby the film 25 is exposed. Thereafter, or after an additional exposing step, the film is developed, so that a line code 4,5,6 with associated pattern 8,11,12 integrated with the image 9 and data 10 is obtained, which is very difficult, if not impossible, to falsify so that the falsification will not be detected. Of course, also relevant data 10 can be drawn by the computer 17 on the screen 22.

In the manufacture of a card according to FIG. 1, a random number generator can control the curvature of the lines 8. In the manufacture of a card according to FIGS. 2 and 3, the computer is programmed so that the lines 11,12 assume a position predetermined in relation to the lines in the line code 5,6.

The technique proper and the device according to FIG. 4 used for the present method are well-known, as also are other devices for exposing a certain pattern or a certain text by means of a computer or printing them by different methods. These devices, therefore, are not described in greater detail, because they do not per se constitute a part of the present invention.

Safety patterns of various kinds and also guillochs are at present stored in computer memories and can be generated by computer-controlled printing devices. When a very high safety level is required, for example for military purposes, a number of starting positions can be used in the computer program for safety patterns, from which positions the computer program indicates a certain specific safety pattern, so that the appearance of the safety pattern depends on the starting positions. In such cases the lines of the line code or the position of parts comprised in another code can constitute such starting positions. Consequently, when the code is specific, for example for a person, a safety pattern specific for the code is generated by means of the lines 8.

Another manufacturing method is printing, which can be advantageous, for example, in the manufacture of many identical documents. The code and associated pattern can be engraved mechanically or manually, and the document thereafter is printed by conventional printing technology.

It is emphasized, however, that the manufacturing method can vary according to demand and suitability for the document or article in question.

The essential gain according to the present invention is that a simple code or text readable by a machine can be secured against falsification, in that some or all of the elements comprised in the code transform to a pattern with a complexity suitable in relation to the application.

Good readability, visually or mechanically, is hereby combined with a high safety level for the document, article or the like.

It is apparent, as exemplified above, that the invention can be varied and applied in many ways.

The invention, thus, must not be regarded restricted to the embodiments set forth above, but can be varied within the scope of the attached claims.

I claim:

1. In a verification defice comprising an object on which a machine-readable arrangement of a plurality of visible characters define a security code incorporated thereon, the improvement comprising a portion of said object separate from said characters having a plurality of visible indicia elements defining a pattern, said elements being visually related in configuration to said respective characters to enable detection of an alteration in one or more of said characters by visual inspection of resulting alteration in said relative configuration of said elements and said characters, without requiring machine-reading of said pattern.

2. The device of claim 1 wherein said characters comprise bars forming a bar code and said indicia elements comprise at least one line extending from a respective one of said bars.

3. The device of claim 2 wherein said line forms an angle with respect to said bar.

4. The device of claim 2 wherein at least a portion of said line is non-linear.

5. The device of claim 2 wherein a plurality of said lines form a wave pattern.

6. The device of claim 1 wherein said indicia elements form a guilloche pattern.

* * * * *